Patented Aug. 1, 1933

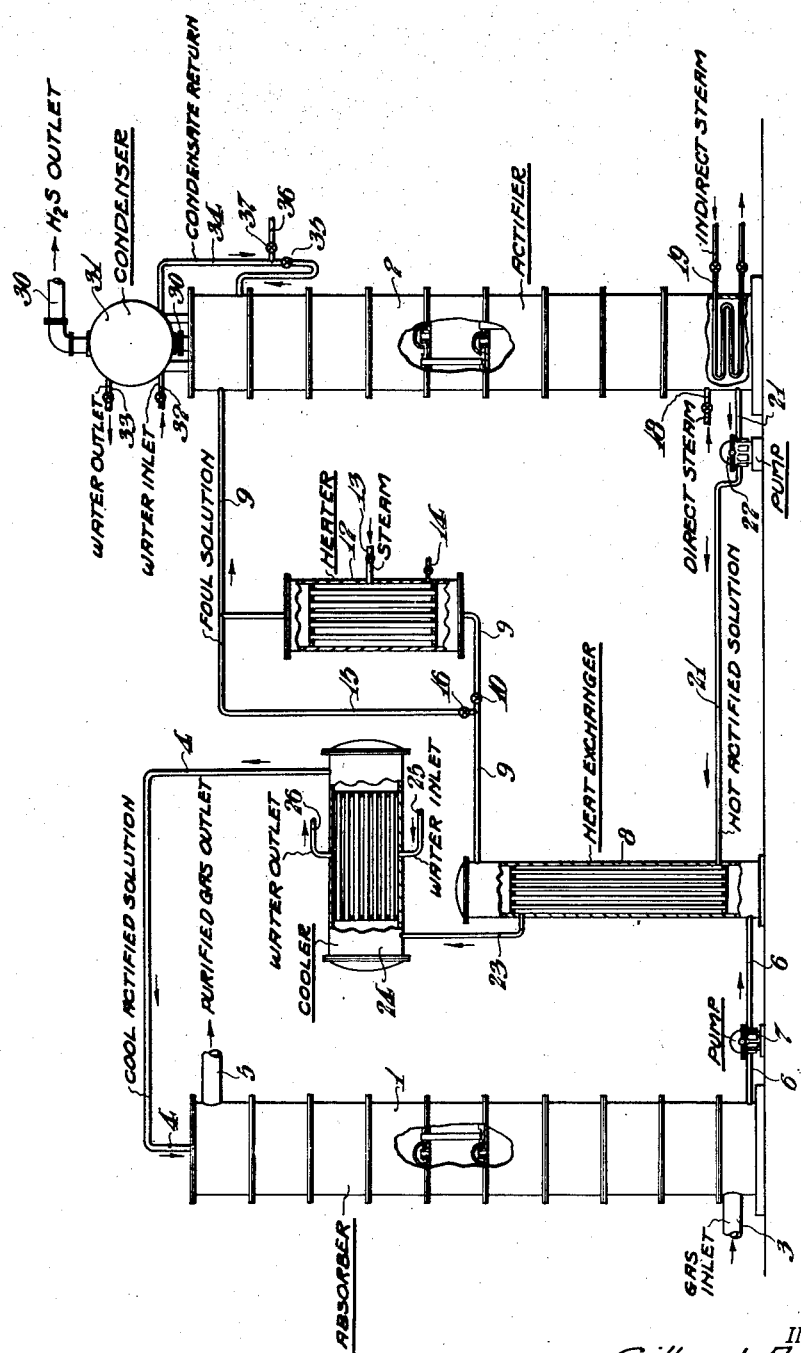

1,920,626

UNITED STATES PATENT OFFICE 1,920,626

SEPARATION AND PURIFICATION OF GASEOUS MIXTURES

Gilbert A. Bragg, Pittsburgh, Pa., assignor to The Koppers Company of Delaware, a Corporation of Delaware Application September 9, 1931. Serial No. 561,877

5 Claims. (Cl. 23—3)

This invention relates to the separation of gaseous mixtures, such, for example, as coal gas, oil gas, water gas, natural gas, or the like, and other gases, such as air and gases of combustion, from acidic constituents, such as hydrogen sulphide, carbon dioxide and hydrogen cyanide, and to the purification of gases or gaseous mixtures containing such constituents as impurities.

My invention has for an object the provision of a separation or purification process of the character set forth in which regeneration or actification of a liquid employed as absorbent for the constituents or impurities is accomplished primarily by heating the same, which process is possessed of especial advantage with respect to this method of actification and in which favorable efficiencies both as to absorption and actification are obtained.

My invention has for further objects such other operative advantages and results as may be found to obtain in the process or processes hereinafter described.

I have found that, in certain instances, the use of heat for actification possesses considerable utility, as compared with aeration or other "cold actification" methods. By "hot actification" is meant actification in which the removal of absorbed constituents or impurities is accomplished primarily by heating the solution.

Thus, while it is not true that gas separation and purification processes employing hot actification methods are always or even generally to be preferred to processes employing other types of actification, such as aeration, it is nevertheless true that there may be instances, especially when the gas to be treated or purified contains unusually large amounts of hydrogen sulphide, carbon dioxide or hydrogen cyanide, in which a process involving the use of hot actification may be preferred.

I have found that an aqueous solution containing an alkali metal hydroxide and boric acid or their equivalents or reaction products in a definite ratio to be described hereinbelow, has especial advantages for use as the absorption medium in a gas separation or purification process in which the actification of the solution is accomplished by heating the same.

When such a solution is employed for scrubbing gases containing hydrogen sulphide, carbon dioxide, or hydrogen cyanide, the latter are absorbed from the gas into the solution by reaction with the alkali metal hydroxide or equivalent active alkali metal compounds contained in the solution. When the solution containing the absorbed constituent or impurity, constituents or impurities, is then heated to drive off the same and to regenerate the active absorbent constituents of the solution, the presence of the non-volatile boric acid or its reaction or decomposition products is found to greatly facilitate the liberation of $H_2S$, $CO_2$ or HCN, so that substantially complete elimination of the same from the solution may be accomplished simply by boiling the solution, especially with steam.

The presence of the boric acid in the solution, however, tends to reduce the capacity of the alkali metal hydroxide or other active alkali metal compound to absorb hydrogen sulphide or the like, and it is therefore necessary to secure a balanced condition in the solution which will insure that both satisfactory absorption and satisfactory actification are obtained.

I have found that such a balance is secured and satisfactory absorption and actification efficiencies are simultaneously obtained if the alkali metal hydroxide and boric acid are maintained in the solution in a molar ratio of from 0.75 : 1 to 0.40 : 1.

It will be understood by those skilled in the art and by chemists generally that while the solution may be originally prepared by adding alkali metal hydroxide and boric acid as such to the solution in the stated ratio, subsequent reaction may reduce or even eliminate the actual amount of alkali metal hydroxide as such and boric acid as such which are present in the solution, and that upon contact with the gas and continued use for purification other reaction products are formed, resulting in still further changes in the actual amounts of alkali metal hydroxide as such and boric acid as such which are present in the solution.

Thus, it may be presumed that potassium hydroxide and boric acid react with each other to form a potassium borate or borates, and it is known that the absorption of $CO_2$ and $H_2S$ from the gas will result in the formation of such appreciably alkaline substances as $K_2S$, KHS, $K_2CO_3$, $KHCO_3$, and the like, as well as such inert and non-alkaline substances as $K_2S_2O_3$, which may be formed in slight amounts. If HCN is absorbed, small amounts of KCNS may also be formed; this product is also inert and non-alkaline.

These inert materials, $K_2S_2O_3$ and KCNS, are not available for the absorption of $H_2S$, $CO_2$ or HCN and cannot be regenerated in the normal course of the process.

The presence of alkali metal in the form of such inert substances as $K_2S_2O_3$ or KCNS has no bearing upon the ratio indicated above, which concerns only the alkali metal present in the form of active, or appreciably alkaline, compounds such as KOH, KHS, $K_2CO_3$, NaOH, NaHS, $Na_2CO_3$, potassium or sodium borates and the like.

The ratio to which I have referred may therefore be expressed as the molar ratio of alkali metal present in the form of a compound or compounds having an alkaline reaction, calculated as KOH or NaOH, as the case may be, to boron present as free boric acid or in combination with a portion or all of said alkali metal, calculated as $H_3BO_3$.

No difficulty is involved in determining this ratio by reason of the fact that the usual methods of determining the presence in the solution of such substances as those indicated ordinarily involve their calculation on the basis of potassium hydroxide and boric acid, respectively.

By way of illustrative example, and for the purpose of explaining in still further detail the ratio recited above, the following method of analysis of a typical solution used for gas purification, may be of value.

A suitable portion of the solution is first titrated with mineral acid, such as $H_2SO_4$ or HCl, of standard strength, using methyl orange as indicator. Where necessary, the indicator is used on a spot plate. The potassium present in the solution in the form of a compound or compounds having an alkaline reaction is then calculated (as ROH, when R represents alkali metal) by standard procedure from the amount of acid required to reach an end point.

The just neutralized solution is then boiled to drive off substantially all volatile acidic gases ($CO_2$, $H_2S$, HCN).

To the boiled solution, which then contains, for example, $R_2SO_4$, $R_2S_2O_3$, RCNS and free boric acid, is added mannite (mannitol, manitol) or glycerine, with phenolphthaline as indicator. The solution is then titrated to a permanent pink color after well known procedure, with $CO_2$-free NaOH. (KOH may be used, but it is more difficult to obtain in a $CO_2$ free state.) From the amount of NaOH required, the boric acid is calculated (as $H_3BO_3$) by standard procedure.

Such inert materials as $K_2S_2O_3$, KCNS, $Na_2S_2O_3$ and NaCNS may be formed to a limited extent by reason of certain side reactions taking place in the system, but at least so far as $K_2S_2O_3$ and $Na_2S_2O_3$ is concerned it has been found that the formation of these is reduced to a minimum, especially where no air or oxygen is present in the system, and probably due also in part to the beneficial effect of the boric acid or borate in depressing or inhibiting the thiosulphate reaction. The formation of KCNS and NaCNS is also low, due to the fact that no free sulphur is present.

The actual concentrations in the solution of the alkali metal hydroxide and boric acid or their equivalents or reaction products may vary within wide limits without affecting the nature of the reactions which take place. When the alkali metal employed is potassium, it is desirable to use a solution containing 5% or more by weight of potassium hydroxide or equivalent, that is to say, of 5% total alkalinity, calculated as KOH.

When sodium is employed as alkali metal, the lower solubility of sodium compounds, such as sodium borates, may necessitate the use of somewhat less concentrated solutions, for example, of 3% total alkalinity, calculated as NaOH.

It will be obvious that the more concentrated the solution, the greater will be its carrying power for hydrogen sulphide and other impurities, so that the more concentrated the solution the smaller the volume of solution required per unit of gas purified. Moreover, the heating and cooling of the solution constitutes the principal operating cost of the process, and for this reason also it is desirable to use as small an amount of solution as possible.

I have refrained from advancing any particular theory as to the reason underlying the improved actification efficiency obtainable in the presence of boric acid or its reaction products or as to the precise nature of the reaction products of the boric acid themselves, as these are matters difficult or incapable of actual proof and their complete understanding is not necessary to the performance of my process and the obtaining of its advantageous results.

I prefer to employ potassium compounds rather than sodium compounds by reason of the much higher solubility of the potassium borates as compared with the solubility of the sodium borates. This higher solubility enables me to employ more concentrated solutions without precipitation of the various compounds from the solution, which precipitation would of course be undesirable.

In actual practice some losses of reactive materials will be encountered both by reason of mechanical losses and by reason of such formation of inert products of side reactions as may occur. Consequently, during the continuance of the process it is from time to time necessary to add fresh quantities of alkali metal hydroxide and boric acid or their equivalents to the solution.

However, so far as is known, the side reactions do not affect the boric acid or borates. It is necessary to add boric acid in very much smaller quantity than alkali metal hydroxide. Consequently, while in preparing the solution the molar ratio indicated above should be adhered to, it will be obvious that during the continuance of the process alkali metal hydroxide and boric acid may not be added in this ratio but are added in such amounts as to maintain in the solution the desired concentration and ratio, as recited above.

The process is carried out in a cycle comprising principally an absorption stage and an actification stage, and for best operating efficiency the recirculation of the solution through this cycle is continuous.

The reactions taking place in the absorption stage are facilitated by increased pressure and a low temperature, whereas the reactions taking place in the actifier are accomplished, as indicated above, at a high temperature and preferably at a reduced pressure. In general, it is ordinarily desired to accomplish actification at a pressure somewhere between atmospheric pressure and a vacuum of 20" of mercury.

In order that my invention may be clearly exemplified, I now describe, with reference to the accompanying drawing, a preferred manner in which my invention may be practiced and embodied. In this drawing, The single figure is a more or less diagrammatic elevational view of apparatus suitable for the purification of fuel gas by means of my process.

Referring to the drawing, it will be seen that the principal apparatus elements are an absorber 1 and an actifier 2. These elements are shown as conventional bell-and-tray type columns arranged for counterflow of gas and liquid, but it will be obvious that other types of gas-and-liquid-contact apparatus may be employed and that concurrent flow apparatus may be substituted for counterflow apparatus wherever desirable.

In the present instance, the gas to be purified enters the bottom of the absorber 1 through an inlet 3 and passes upward through the absorber 1 in countercurrent to the downward flow of the purifying solution which is admitted through a conduit 4 to the top of the absorber 1. The thereby purified gas leaves the top of the absorber through a conduit 5.

The purifying solution which, as recited hereinabove, contains potassium or other alkali metal hydroxide and boric acid or their equivalents or reaction products in the ratio stated above, passes downward through the absorber 1 and absorbs the bulk of the acidic impurities from the gas. Upon reaching the bottom of the absorber 1, the solution is withdrawn through a conduit 6 and delivered by a pump 7 to a heat exchanger 8 where it absorbs heat from the hot actified solution leaving the actifier 2, as will be described hereinbelow.

The heated solution then passes through a conduit 9 having a valve 10 and through an indirect heater 12 located in the conduit 9 to the upper portion of the actifier 2. The heater 12 in the conduit 9 is provided with a valved inlet 13 for the admission of a heating fluid, such as steam, and may also be provided with a valved condensate drain pipe 14.

If sufficient heating of the solution has been accomplished in the heat exchanger 8, all or a portion of the solution, instead of being passed through the heater 12, may be by-passed around the latter through a conduit 15 having a valve 16.

The solution containing the impurities absorbed from the gas in the absorber 1 then passes downward through the interior of the actifier 2. Heat is meanwhile supplied to the solution either through a direct steam inlet 18 or an indirect steam coil 19, which are provided in the actifier 2 for that purpose, or by means of any other suitable heating device or method.

Whether direct or indirect steam is used, the solution is brought to its boiling point or a little below same and maintained at such temperature until the impurities removed from the gas are in turn removed from the solution to the desired extent, that is to say, until the solution is again capable of accomplishing a suitable purification of the gas when returned to the absorber 1.

The hot actified solution is then withdrawn from the bottom of the actifier 2 through a conduit 21 by means of a pump 22 and is delivered to the indirect heat exchanger 8, where, as above noted, it is brought into indirect contact with the fouled solution leaving the absorber 1 and gives up a considerable portion of its heat to the fouled solution. The thereby partially cooled actified solution then passes through a conduit 23 to an indirect cooler 24 of suitable type which may be provided with conduits 25 and 26 for the admission and removal, respectively, of water or other cooling medium. The cooled actified solution then passes from the cooler 24 through the conduit 4 into the absorber 1, thus completing the cycle.

During the actification or regeneration of the solution in the actifier 2 the impurities removed from the gas in the absorber 1 are almost entirely volatilized and pass out of the actifier 2 through an outlet 30 located at or near the top thereof. The gas passing out through the conduit 30 may contain considerable amounts of steam.

Where direct steam is employed for heating the solution in the actifier 2 it is not suitable to return this steam in condensed form to the solution, but where indirect steam is employed for heating it may be desirable to condense and return this steam to the solution in order to prevent loss of the latter by evaporation. For this purpose the conduit 30 is provided with a condenser 31 having conduits 32 and 33 for the admission and removal, respectively, of a cooling medium such as water.

The gases passing through the condenser 31 are cooled to below the condensing point of steam and the aqueous condensate may be returned to the actifier 2 through a sealed conduit 34 having a valve 35, or, where the return of this condensate to the actifier 2 is not desired, it may be drawn off through a conduit 36 having a valve 37.

When the pressures in the absorber 1 are greater than atmospheric, a suitable pressure-release device (not shown) may be inserted in the conduit 6 for maintaining the desired pressure in the absorber. Also, the conduit 30 may be placed in communication with a suitable exhauster or vacuum pump or other device for maintaining the reduced pressure within the actifier 2.

It will be obvious to those skilled in the art that the apparatus shown in the drawing by way of illustrative example is more or less conventional and is susceptible of considerable modification in detail, arrangement and the like, and my process is consequently not to be limited to the use of the particular apparatus shown in the figure.

It will be apparent from the above that the process of my invention is admirably suited for the purification of gases from acidic impurities such as hydrogen sulphide, hydrogen cyanide and carbon dioxide, especially where the use of small quantities of absorbent liquid and hot actification methods are desired. Among the advantages of my process may be included relative freedom from formation of products of side reaction, such as thiosulphate, and the consequent low cost of replenishment of the active ingredients of the solution, and also the fact that, as compared with other processes employing aeration, the gases removed in the actifier 2 are substantially free from air or constituents thereof and are consequently in a remarkably pure state and susceptible for many uses for which they would otherwise not be suitable.

For example, when the gas removed in the absorber 1 is hydrogen sulphide, the hydrogen sulphide liberated in the actifier 2 will be especially suitable for the manufacture of sulphuric acid. As a typical example of the application of my process may be mentioned the purification from hydrogen sulphide of cracking still gases produced in an oil refinery, the hydrogen sulphide being converted to sulphuric acid which may subsequently be used for the refining of the oil produced in the refinery.

The carrying power of my solution with respect to impurities is very great and the amount of solution necessary to effect a given purifying or separating operation is correspondingly low. This results in reduction of the sizes of the individual absorption and actification units as well as in the size of the plant as a whole, and also in decreased costs of pumping and other incidental expenses.

Except as indicated above, the actual concentrations, rate of recirculation of the solution, temperatures and pressures are best judged by the operator in accordance with the particular purification problem dealt with in each case, and being matters well within the grasp of those skilled in the art need not be recited in further detail here. Consequently, it will be obvious that my invention is not limited to any operative details disclosed hereinabove except as specified in the claims hereinafter made.

It will also be apparent, that while my invention has especial advantage with reference to the purification of gases from $H_2S$, $CO_2$ or HCN, present as impurities, in its broad aspect it is not limited to gas purification, but may be applied to the separation of $H_2S$, $CO_2$ or HCN, or any combination of the same, from gaseous mixtures of which they are constituents, whether principal or secondary.

I claim as my invention:

1. The process of separating acidic gases such as $H_2S$, $CO_2$ and HCN from a gaseous mixture containing them, which comprises washing the flowing gaseous mixture with an absorbent liquid, removing the absorbent liquid from the gas, heating it to drive off absorbed acidic gases and recirculating it over the flowing gaseous mixture for further absorption of acidic gases, said liquid comprising a solution containing alkali metal present in a compound or compounds having an alkaline reaction, and boron present as free boric acid or in combination with a portion or all of said alkali metal, the molar ratio of said alkali metal to said boron being from 0.75:1 to 0.40:1, calculated as ROH (where R represents alkali metal) and $H_3BO_3$, respectively.

2. The process of separating acidic gases such as $H_2S$, $CO_2$ and HCN from a gaseous mixture containing them, which comprises washing the flowing gaseous mixture with an absorbent liquid, removing the absorbent liquid from the gas, heating it to drive off absorbed acidic gases and recirculating it over the flowing gaseous mixture for further absorption of acidic gases, said liquid comprising a solution containing alkali metal present in a compound or compounds having an alkaline reaction, and boron present as free boric acid or in combination with a portion or all of said alkali metal, the molar ratio of said alkali metal to said boron being from 0.75:1 to 0.40:1, calculated as ROH (where R represents alkali metal) and $H_3BO_3$, respectively, and said heating of the solution taking place under a pressure less than atmospheric.

3. The process of separating acidic gases such as $H_2S$, $CO_2$ and HCN from a gaseous mixture containing them, which comprises washing the flowing gaseous mixture with an absorbent liquid, removing the absorbent liquid from the gas, heating it to drive off absorbed acidic gases and recirculating it over the flowing gaseous mixture for further absorption of acidic gases, said liquid comprising a solution containing potassium present in a compound or compounds having an alkaline reaction, and boron present as free boric acid or in combination with a portion or all of said potassium, the molar ratio of said potassium to said boron being from 0.75:1 to 0.40:1, calculated as KOH and $H_3BO_3$, respectively.

4. The process of separating acidic gases such as $H_2S$, $CO_2$ and HCN from a gaseous mixture containing them, which comprises washing the flowing gaseous mixture with an absorbent liquid, removing the absorbent liquid from the gas, heating it to drive off absorbed acidic gases and recirculating it over the flowing gaseous mixture for further absorption of acidic gases, said liquid comprising a solution containing potassium present in a compound or compounds having an alkaline reaction, and boron present as free boric acid or in combination with a portion or all of said potassium, the molar ratio of said potassium to said boron being from 0.75:1 to 0.40:1, calculated as KOH and $H_3BO_3$, respectively; the total alkalinity of the solution, calculated as KOH, being of the order of 5% by weight of the solution, or more.

5. The process of separating acidic gases such as $H_2S$, $CO_2$ and HCN from a gaseous mixture containing them, which comprises washing the flowing gaseous mixture with an absorbent liquid, removing the absorbent liquid from the gas, heating it to drive off absorbed acidic gases and recirculating it over the flowing gaseous mixture for further absorption of acidic gases, said liquid comprising a solution containing sodium present in a compound or compounds having an alkaline reaction, and boron present as free boric acid or in combination with a portion or all of said sodium, the molar ratio of said sodium to said boron being from 0.75:1 to 0.40:1, calculated as NaOH and $H_3BO_3$, respectively.

GILBERT A. BRAGG.